United States Patent
Krüger-Gotzmann et al.

(10) Patent No.: US 7,057,305 B2
(45) Date of Patent: Jun. 6, 2006

(54) WIND POWER INSTALLATION WITH SEPARATE PRIMARY AND SECONDARY COOLING CIRCUITS

(75) Inventors: Manfred Krüger-Gotzmann, Berlin (DE); Christian Schiller, Berlin (DE); Günter Zwarg, Berlin (DE)

(73) Assignee: Siemens Aktiengasellschaft, München (DE)

( * ) Notice: Subject to any disclaimer, the term of this patent is extended or adjusted under 35 U.S.C. 154(b) by 0 days.

(21) Appl. No.: 11/042,836

(22) Filed: Jan. 24, 2005

(65) Prior Publication Data

US 2005/0167989 A1    Aug. 4, 2005

Related U.S. Application Data

(63) Continuation of application No. PCT/DE03/02355, filed on Jul. 11, 2003.

(30) Foreign Application Priority Data

Jul. 25, 2002    (DE) .................. 102 33 947

(51) Int. Cl.
  *F03D 11/00*    (2006.01)
  *H02K 9/00*    (2006.01)
(52) U.S. Cl. .......................... 290/55; 310/64
(58) Field of Classification Search .................. 310/52, 310/54, 57; 290/2; 322/33, 34
See application file for complete search history.

(56) References Cited

U.S. PATENT DOCUMENTS

| | | | |
|---|---|---|---|
| 4,348,604 A * | 9/1982 | Thode | 310/62 |
| 4,807,354 A * | 2/1989 | Capuano et al. | 29/596 |
| 4,832,116 A * | 5/1989 | Easton | 165/126 |
| 4,845,394 A * | 7/1989 | Kleinhans | 310/64 |
| 5,844,333 A | 12/1998 | Sheerin | |
| 6,246,134 B1 * | 6/2001 | Berrong et al. | 310/52 |
| 6,499,532 B1 * | 12/2002 | Williams | 165/47 |
| 6,639,328 B1 * | 10/2003 | Wacknov | 290/52 |
| 2001/0035651 A1 | 11/2001 | Umemoto et al. | |

FOREIGN PATENT DOCUMENTS

| | | |
|---|---|---|
| DE | 198 02 574 A | 3/1999 |
| DE | 199 32 394 C2 | 1/2001 |
| DE | 199 47 915 A1 | 4/2001 |
| DE | 100 00 370 A | 7/2001 |
| DE | 100 16 913 A1 | 10/2001 |
| WO | WO 99/30031 A | 6/1999 |
| WO | WO 01/21956 A | 3/2001 |

* cited by examiner

*Primary Examiner*—Nicholas Ponomarenko
(74) *Attorney, Agent, or Firm*—Henry M. Feiereisen

(57) ABSTRACT

A wind power installation includes a nacelle for housing a generator, and a turbine having at least one rotor blade. At least the generator includes a closed primary cooing system, and the nacelle is provided with a cooling system for cooling the primary cooling system in dependence on an output of the generator or generator losses.

13 Claims, 3 Drawing Sheets

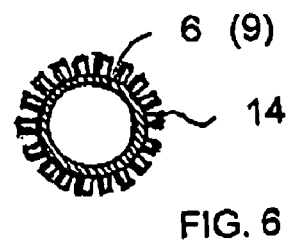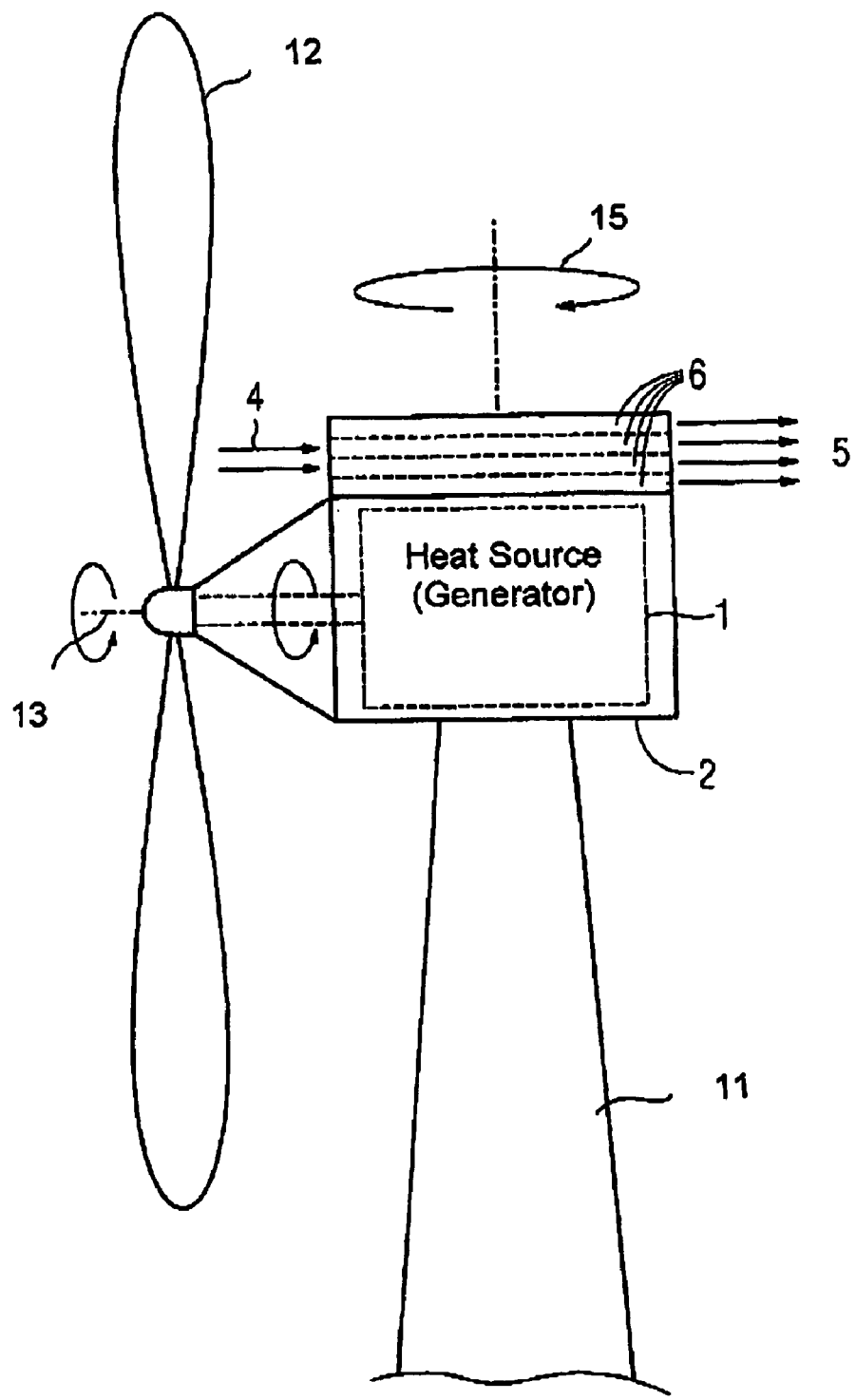

WIND POWER INSTALLATION WITH SEPARATE PRIMARY AND SECONDARY COOLING CIRCUITS

CROSS-REFERENCES TO RELATED APPLICATIONS

This application is a continuation of prior filed copending PCT International application no. PCT/DE2003/002355, filed Jul. 11, 2003, which designated the United States and on which priority is claimed under 35 U.S.C. §120, and which claims the priority of German Patent Application, Serial No. 102 33 947.3, filed Jul. 25, 2002, pursuant to 35 U.S.C. 119(a)–(d).

BACKGROUND OF THE INVENTION

The present invention relates, in general, to a wind power plant, and more particularly to a wind power installation of a type having a generator disposed in a nacelle and including a cooling circuit, and a turbine with at least one rotor blade.

Nothing in the following discussion of the state of the art is to be construed as an admission of prior art.

Typically, a wind power plant has a rotor blade which is rotatable around a horizontal axis and pivotable around a vertical axis to turn the rotor blade in appropriate alignment to the wind. The rotor blade is rotated by wind velocity at speed depending on diameter and shape of the rotor blade and its pitch to drive a generator, so that wind power is converted into electric energy. The conversion of energy normally results in energy loss in the form of heat. This heat loss applies in both the conversion of kinetic energy of wind into electric energy in the generator of a wind power plant as well for the electrical feeding of energy, generated by the wind power plant, into an electric power supply network. This heat loss takes place also in other electrical components, in particular the electronic power equipments, such as e.g. inverter or transformer. Also other components of the wind power plant heat up such as gears, bearings or control units like, e.g., hydraulic systems or similar control and regulation units, which adjust the rotor blades or turn the wind power plant towards the wind.

The heat loss amounts hereby to 5 to 7% of the installed nominal output. Heretofore, the heat loss has been dissipated into the environment by using fans which pull in cold air from outside to cool the corresponding component, e.g., the generator. The heated air is then discharged again to the outside. This is disadvantageous especially when the outside air is humid or has a high salt content particularly in coastal regions, and the components to be cooled are then exposed to this humid and salty air.

German patent publication no. DE 198 02 574 A1 describes a wind power installation having a generator which is cooled by an air stream produced by low pressure at a mouth of a rotor blade. This low pressure results in a pressure drop between each mouth of a rotor blade and an opening on a rotor blade distal side of the nacelle. As a consequence, ambient air is drawn in at the opening in opposition to the actual wind direction and flows via the flow path through the nacelle and through the interior of a rotor blade toward the mouth of this rotor blade. The provision of such a closed circulating ventilation is disadvantageous and, especially when located off-shore, results air with high salt content being aspirated. Moreover, noise is generated by the mouths at the rotor blades.

German patent publication no. DE 199 47 915 A1 describes a cooling system for cooling heat-generating structures in particular of a wind power plant, using a chimney effect of heated air to cool the structures in the foot region of the tower and also in a top area of the nacelle. It is hereby disadvantageous that the tower cross section is already formed with channels. Moreover, also a closed circulating ventilation system is involved here which is susceptible to penetration of dirt and humidity and thus is unsuitable for carrying out a reliable operation.

U.S. patent publication no. 2001/0035651 describes a wind power generating device in which lost energy of the generator is dissipated to the ambient air by direct heat conduction to the outer skin of the nacelle which is provided with ribs for surface enlargement. This cooling system is however able to dissipate only little heat energy.

It would therefore be desirable and advantageous to provide an improved wind power installation which obviates prior art shortcomings and is reliable in operation even for off-shore operation, without experiencing breakdown or maintenance works as a result of contaminated or salty cooling air.

SUMMARY OF THE INVENTION

According to one aspect of the present invention, a wind power installation includes a nacelle, a generator disposed in the nacelle, a turbine having at least one rotor blade, wherein at least the generator includes a closed primary cooing circuit, and wherein the nacelle has a secondary cooling system for cooling the primary cooling circuit in dependence on an output of the generator or generator losses.

It will be appreciated by persons skilled in the art that cooling by means of the primary cooling circuit should not be limited to the generator only but also includes other electrical equipments such as converters or slip-ring members of the generator.

By separating the primary cooling circuit from the secondary cooling circuit, a wind power installation in accordance with the present invention can be erected at any site, irrespective of adverse outer conditions. In other words, the wind power installation can also be built offshore where humid and salty air is prevalent because the primary cooling circuit is encapsulated or enclosed internally and a sufficient cooling action of the nacelle can be realized using the wind. The air velocity about the nacelle is dependent on wind strength, whereby the relationship between wind strength and generator output and thus also generator losses is proportional.

Suitably, the nacelle is constructed as secondary air cooler so as to realize an air-air cooler.

According to another feature of the present invention, the secondary air cooler may be constructed in the form of a heat exchanger which is designed as tube bundle and secured to the nacelle or forming part of the nacelle. Suitably, the tube bundle is disposed in an upper portion about the nacelle. Heated air produced by the generator or other electrical components connected to the primary cooling circuit rises or is forced by fans into the interstices between the tube bundles and cooled there by wind flowing through the tube bundles. The cooled air of the primary cooling circuit is flowed back through natural convection or by a further fan for cooling the generator or other electrical components disposed in the nacelle. The arrangement of the tube bundle on the nacelle ensures an alignment of the tubes of the tube bundle in parallel relationship to a wind direction so as to provide a sufficient cooling action by wind velocities and sufficient passage of air through the tube bundle. The tube bundle forms the heat exchanger between the primary and secondary circuits.

To provide a particularly efficient heat transfer, the tubes may be formed with surface-enlarging structures.

According to another feature of the present invention, the secondary cooler has an inlet and an outlet, wherein the inlet or the outlet of the secondary cooler is disposed on the nacelle at a location which has enhanced flow dynamics.

According to another feature of the present invention, air of the primary cooling circuit exits the nacelle via tubes. Suitably, the nacelle may be constructed such as to resemble a handle-shaped object when viewed in wind direction. Accordingly, the primary cooling circuit may have at least one handle-shaped tubular member on the nacelle, with ambient air, i.e. wind, freely flowing about the handle-shaped tubular member and defining the secondary cooling circuit. Suitably, the tubes have at least one outlet provided in the upper portion of the nacelle, and at least one inlet preferably disposed in the lower portion of the nacelle so as to enable a natural convection of air of the primary cooling circuit. To assist the natural convection, fans, in particular axial fans, may be provided.

Compared with facilities operating with air-water cooling systems, a wind power installation according to the present invention has the advantage of being compact, substantially maintenance-free and reliable operation, without any need for preparing coolants in great amounts. As a result, costs are low. Compared to wind power plants with closed circulating ventilation in particular of the generators, a wind power installation according to the present invention is less likely to breakdown as a result of humid or salty air.

The outgoing heated air of the primary cooling circuit can be used to heat the nacelle, rotor blades, in particular during the cold season. Condensate formations on electrical equipment and ice build up on the rotor blades are thereby eliminated.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 5 is another schematic illustration of the wind power installation of FIG. 1; and FIG. 6 is a schematic illustration of a tube with surface-enlarging elements.

DETAILED DESCRIPTION OF PREFERRED EMBODIMENTS

Figure 1:
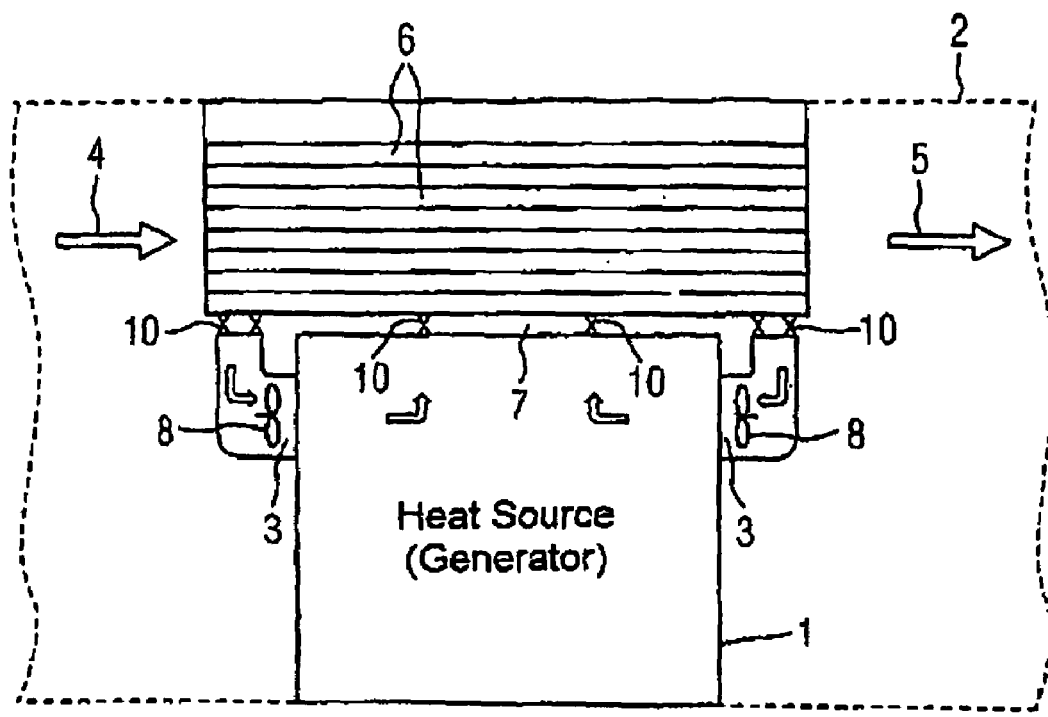
FIG. 1 is a longitudinal section of one embodiment of a wind power installation according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a longitudinal section of one embodiment of a wind power installation according to the present invention, including a nacelle 2 which is supported by tower 11 (FIG. 5). The nacelle 2 supports at least one rotor blade 12 which is rotatable around a horizontal axis 13 by wind velocity to drive a generator, so that wind power is converted into electric energy. Besides the generator, the nacelle 2 accommodates also other heat-generating electrical components, e.g. converter or slip-ring member of the generator. For sake of simplicity, reference numeral 1 is used in FIG. 1 to generally indicate a heat-generating source 1. Although not shown in detail, the generator as heat source 1 has a laminated stator core and laminated rotor core, whereby the laminations of the stator and/or the rotor are traversed in a manner known per se by radial and//or axial ventilation channels defining a closed primary cooling circuit. Furthermore, the air of the primary cooling circuit may flow through the air gap of the generator.

The nacelle 2 further accommodates above the heat source 1 a system of tube bundles 6. Currently preferred is the arrangement of the system of tube bundles 6 upon the top surface of the nacelle 2. Wind for driving the rotor blade 12 on the nacelle 2 flows through the tube bundles 6 in axial direction and enters the system of tube bundles 6 via an inlet, as indicated by arrow 4, and exits the tube bundles 6 through outlet, as indicated by arrow 5 to thereby define an open secondary cooling circuit. The tube bundles 6 act as heat exchanger between the inlet 4 and outlet 5 to transfer heat from air, circulating in the closed primary cooling circuit of the heat source 1, to wind sweeping through the system of tube bundles 6. The heated air from the heat source 1 enters the system of tube bundles 6 via an outlet 7, is cooled there and flowed back through convection and/or a fan 8 via tubes 3 to the heat source 1. Reference numeral 10 designates the transition zones between the primary cooling circuit and the secondary cooling circuit realized by the heat exchanger in the form of tube bundles 6.

Figure 2:
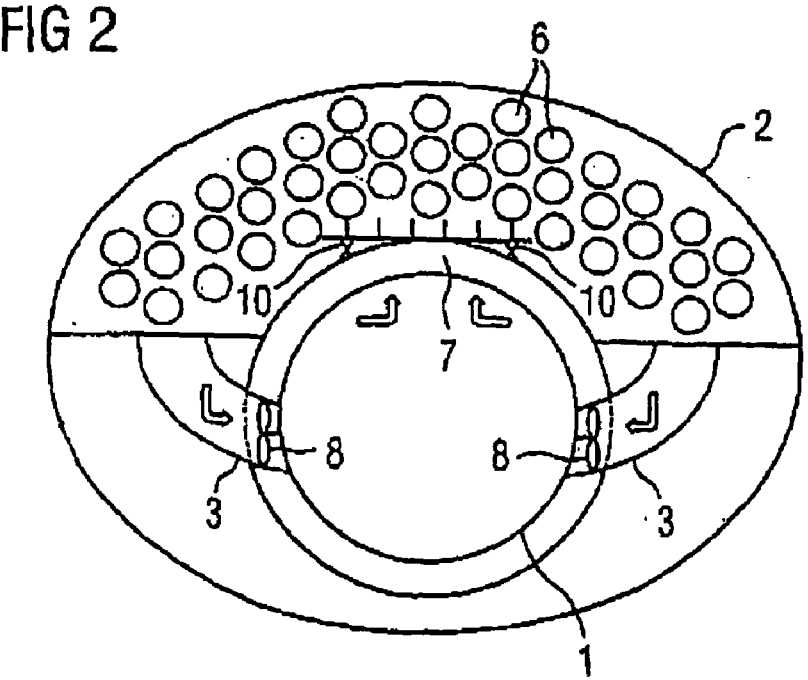
FIG. 2 is a cross section of a variation of the wind power installation of FIG. 1.

FIG. 2 shows a cross section of a variation of the wind power installation with different disposition and configuration of the tubes 3, and depicts in more detail the arrangement of the tube bundles 6 in the nacelle 2. The tubes of the tube bundles 6 have a cylindrical configuration and are suitably formed with surface-enlarging structures 14 (FIG. 6) to enhance the cooling efficiency. Examples of such surface-enlarging structures 14 may include ribs or fins. The nacelle 2 is constructed for rotational movement, as indicated by arrow 15, to properly align the rotor blade or blades 13 of the wind power installation in relation to the wind direction and thus to enable an alignment of the tube bundles 6 in axis-parallel relationship to the wind direction. As a result, the air throughput through the tube bundles 6 is increased and the cooling efficiency is improved.

Figure 3:
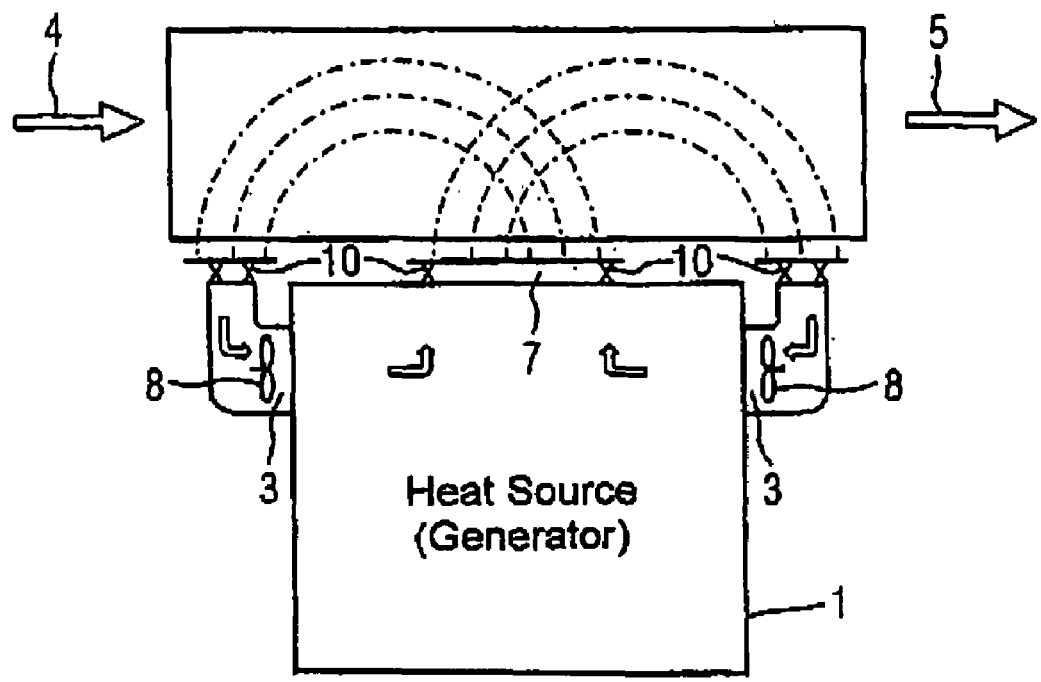
FIG. 3 is a longitudinal section of another embodiment of a wind power installation according to the present invention.

Referring now to FIG. 3, there is shown a longitudinal section of another embodiment of a wind power installation according to the present invention. Parts corresponding with those in FIG. 1 are denoted by identical reference numerals and not explained again. The description below will center on the differences between the embodiments. In this embodiment, the outlet 7 of the primary cooling circuit is constructed in the form of a handle-shaped, tubular member 9 (see FIG. 4) which projects from the outlet 7 to an area outside the nacelle 2 and is returned for connection to the primary cooling circuit of the heat source 1 via an inlet 3. The heat transfer of the primary cooing circuit takes also place by natural convection and/or fan 8. The tubular members 9 may be assembled on site from single parts.

Figure 4:
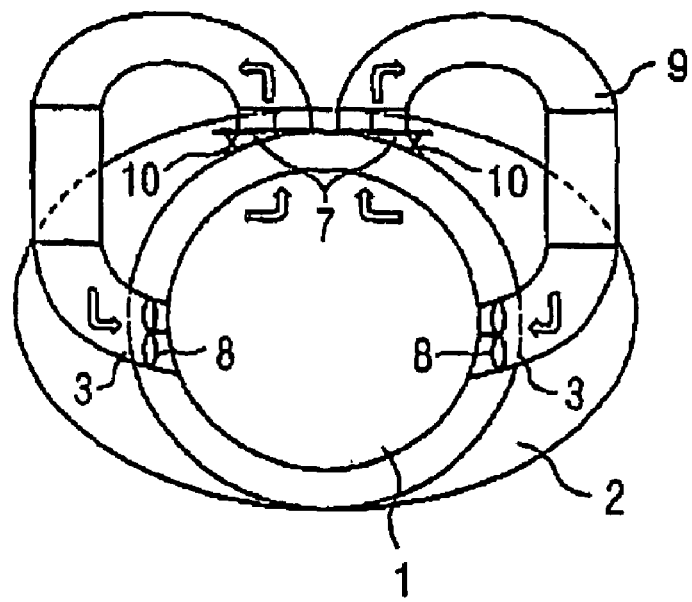
FIG. 4 is a cross section of a variation of the wind power installation of FIG. 3.

FIG. 4 shows a cross section of a variation of the wind power installation of FIG. 3 with different disposition and configuration of the tubes 3, and depicts in detail the basic arrangement of the tube system of the primary cooling circuit of the heat source 1 with its tubes extending in wind direction and suitably formed with surface-enlarging structures 14 (FIG. 6). The convection of heated air in the primary cooling circuit can be facilitated by disposing the outlet 7 in the upper portion of the nacelle 2 and by disposing the entry of the tubes 3 below the outlet 7 in midsection or lower portion of the nacelle 2.

A wind power installation according to the present invention has the following advantages: There is no need for an intermediate water circuit, including of the air-water cooler of the generator. The provision of an air-air cooler outside the heat source 1 allows the creation of more space in the tight nacelle 2. Operation is significantly safer compared to conventional systems while at the same time maintenance work can be reduced. There is no need for a cooling water supply and for a cooling water preparation and supervision. The energy consumption of the secondary devices such as, e.g., water pumps or monitoring devices, is reduced. The heated air of the primary cooling circuit may also be used to heat the nacelle 2 or even the rotor blades so as to prevent problems relating to ice buildup during the cold winter months. Suitably, fans are hereby provided to realize a proper air circulation.

Compared to wind power installations with closed circulating ventilation, the wind power installation according to the present invention is also safer to operate as no humid air or salty air is conducted into the operating space of the electrical components or equipments.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A wind power installation, comprising:
    a nacelle rotatably mounted for positioning in a wind direction;
    a generator disposed in the nacelle and including a closed primary cooling system;
    a turbine connected to the nacelle and having at least one rotor blade rotated by wind power for driving the generator to produce electric energy, and
    a secondary cooling system connected to the nacelle so as to align in wind direction as the nacelle rotates and being passed by circulating heated air generated by the primary cooling system during cooling of the generator for cooling the heated air from the primary cooling system.

2. The wind power installation of claim 1, wherein the secondary cooling system includes an air cooler which is thermally coupled to the primary cooling system.

3. The wind power installation of claim 2, wherein the primary and secondary cooling systems define an air-air cooler.

4. The wind power installation of claim 2, wherein the secondary cooling system includes a heat exchanger in the form of a tube bundle placed upon the nacelle.

5. The wind power installation of claim 2, wherein the secondary cooling system has an inlet and an outlet, at least one of the inlet and outlet of the secondary cooling system being disposed on the nacelle.

6. The wind power installation of claim 2, wherein the nacelle has at least one handle-shaped tubular member by which the nacelle forms at least part of the secondary cooling system and thereby provides a heat exchanger.

7. The wind power installation of claim 6, wherein outgoing air from the primary cooling system exits the nacelle through an outlet at an upper portion of the nacelle and is flowed back into the nacelle at a location below the outlet.

8. The wind power installation of claim 1, and further comprising a fan for assisting a natural convection of the primary cooling system.

9. The wind power installation of claim 1, wherein the primary cooling system is constructed to allow outgoing air to heat the nacelle and the rotor blade.

10. The wind power installation of claim 4, wherein the tube bundle has plural tubes formed with surface-enlarging structures.

11. The wind power installation of claim 6, wherein the handle-shaped tubular member of the nacelle is formed with surface-enlarging structures.

12. The wind power installation of claim 4, wherein the tube bundle is disposed on the nacelle.

13. The wind power installation of claim 4, wherein the tube bundle is disposed in the nacelle.

* * * * *